United States Patent [19]

Ruppert

[11] 4,092,547
[45] May 30, 1978

[54] SWITCH BLOCK

[76] Inventor: Henry C. Ruppert, Box 1001, 4418 Blackstone Ct., Bloomington, Ind. 47401

[21] Appl. No.: 658,513

[22] Filed: Feb. 17, 1976

[51] Int. Cl.² ........................................... H02B 13/06
[52] U.S. Cl. ..................................... 307/113; 361/333
[58] Field of Search ................... 317/103; 307/85, 19, 307/113; 174/43, 45 R, 98, 99 R, 148, 149 R, 72 R; 361/331, 332, 333, 346, 347, 349, 335

[56] References Cited

U.S. PATENT DOCUMENTS

| | | | |
|---|---|---|---|
| 1,709,780 | 4/1929 | Davies | 317/103 |
| 1,735,179 | 11/1929 | Randall | 317/103 |
| 1,786,830 | 12/1930 | Davies | 317/103 |
| 1,879,000 | 9/1932 | Ainsworth | 317/103 |
| 1,906,421 | 5/1933 | Rossman | 317/103 |
| 2,047,000 | 7/1936 | Calvert | 317/103 |
| 3,787,711 | 1/1974 | Bright | 317/103 |
| 3,823,346 | 7/1974 | Olsen | 317/103 |

FOREIGN PATENT DOCUMENTS

| | | | |
|---|---|---|---|
| 1,295,052 | 5/1969 | Germany | 317/103 |
| 2,322,771 | 11/1974 | Germany | 317/103 |

*Primary Examiner*—L. T. Hix
*Assistant Examiner*—Stafford D. Schreyer
*Attorney, Agent, or Firm*—Jenkins, Coffey & Hyland

[57] ABSTRACT

A prefabricated unitary switch block for use with a multi-phase power circuit bus, a multi-phase load circuit and an automatic circuit recloser for protecting the bus and load circuit against overloading. The switch block comprises a plurality of external bus terminals and a plurality of external load terminals. Additionally, the switch block carries a plurality of selectively operable bus-side disconnect switches, each having a terminal connected internally of the switch block to a corresponding one of the external bus terminals and a terminal connected to a corresponding terminal of the circuit recloser. The switch block also carries a plurality of selectively operable load-side disconnect switches, each having a terminal connected to a corresponding one of the external load terminals and a terminal connected to a corresponding terminal of the circuit recloser. In one embodiment, the switch block further comprises a plurality of selectively operable by-pass switches. Each by-pass switch has one terminal connected externally of the switch block to a corresponding one of the bus-side disconnect switch terminals, and another terminal connected internally of the switch block to a corresponding one of the load terminals. Operation of the by-pass switches selectively by-passes the automatic circuit recloser. In another embodiment, a multi-phase transfer bus is provided and the switch block further includes a plurality of external transfer bus terminals. Each of the external transfer bus terminals is connected to a corresponding one of the transfer bus multiple phases. The switch block includes a plurality of selectively operable bus transfer switches. Each of the bus transfer switches has a terminal connected externally of the switch block to a corresponding one of the load-side disconnect switch terminals, and a terminal connected internally of the switch block to a corresponding one of the transfer bus terminals. Opening of the bus-side or load-side disconnect switches and closing of the bus transfer switches allows the load circuit to draw power from the transfer bus.

20 Claims, 15 Drawing Figures

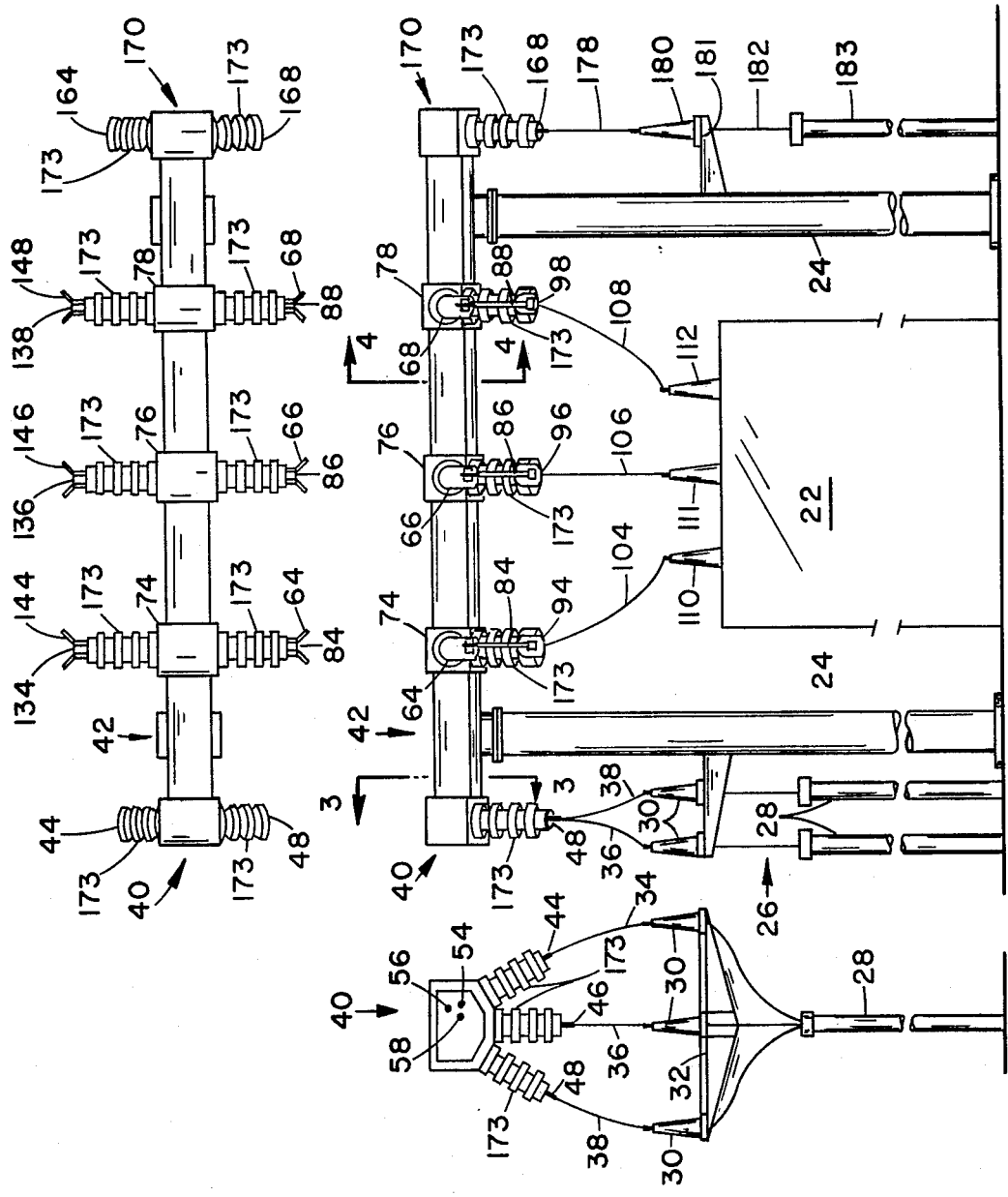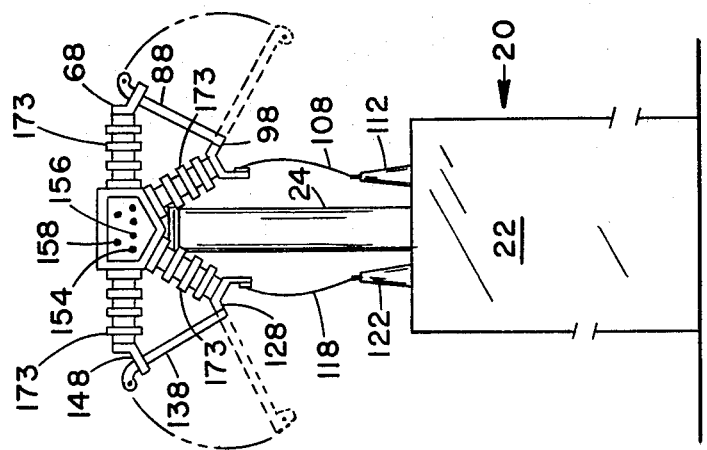

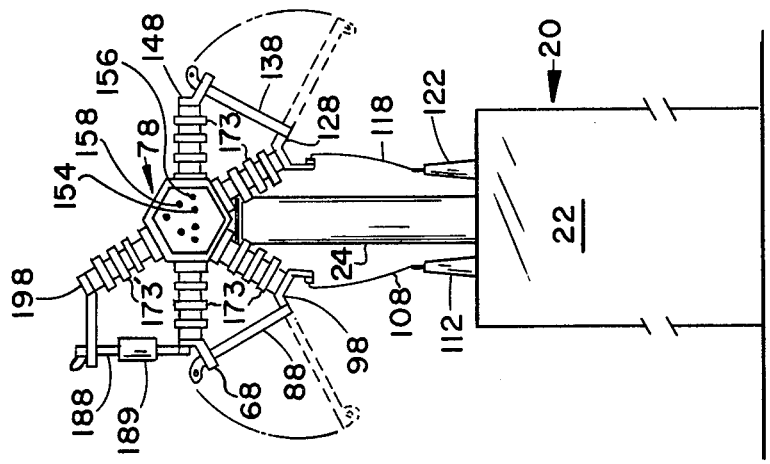
FIG. 7
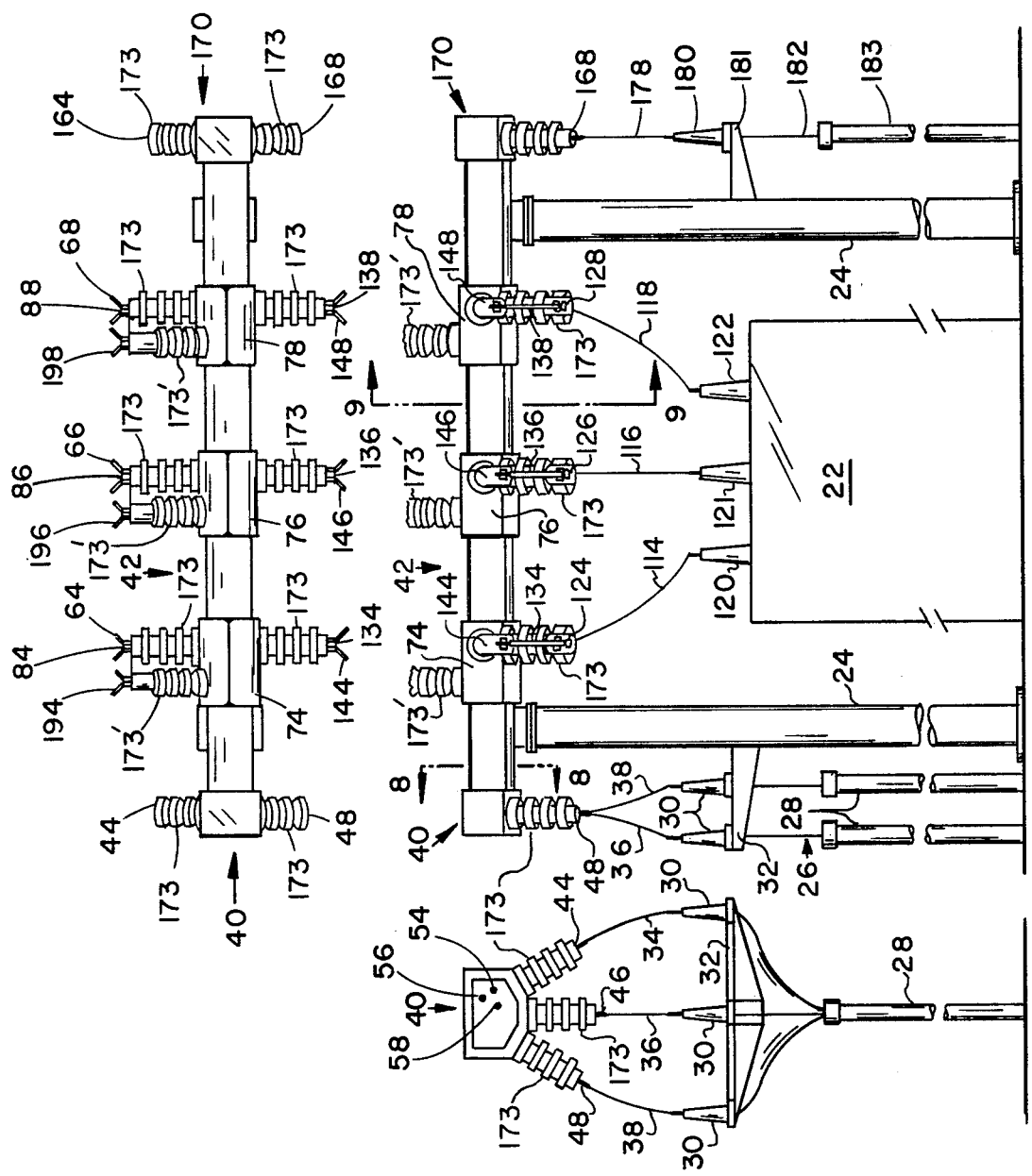
FIG. 6
FIG. 8
FIG. 9

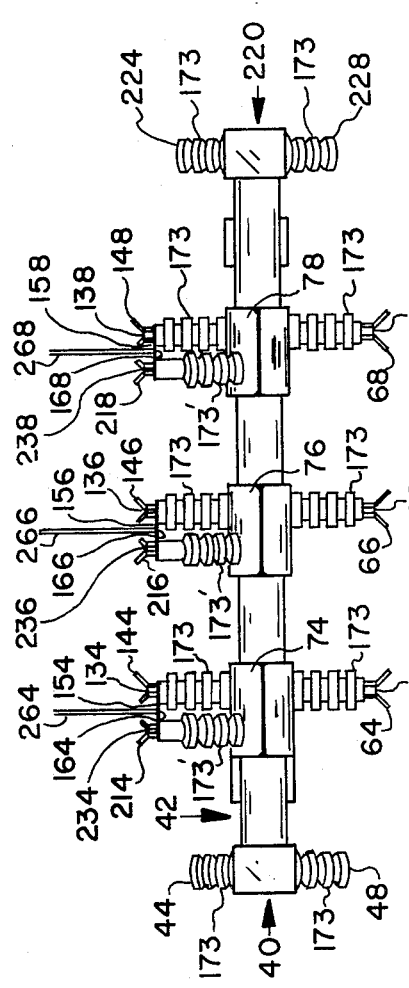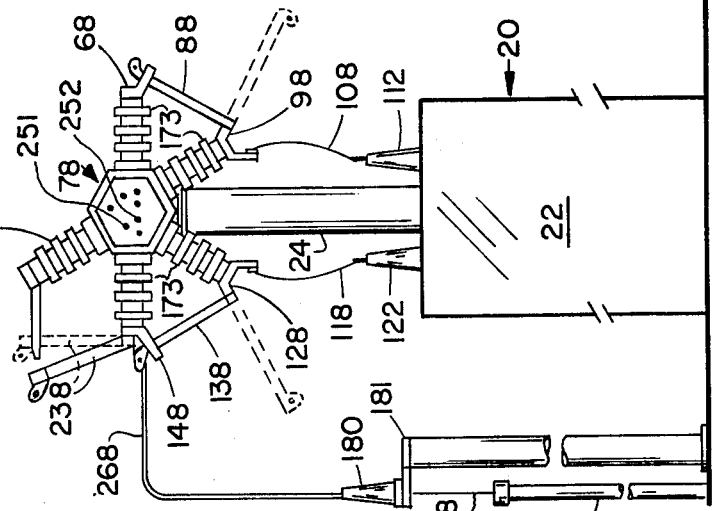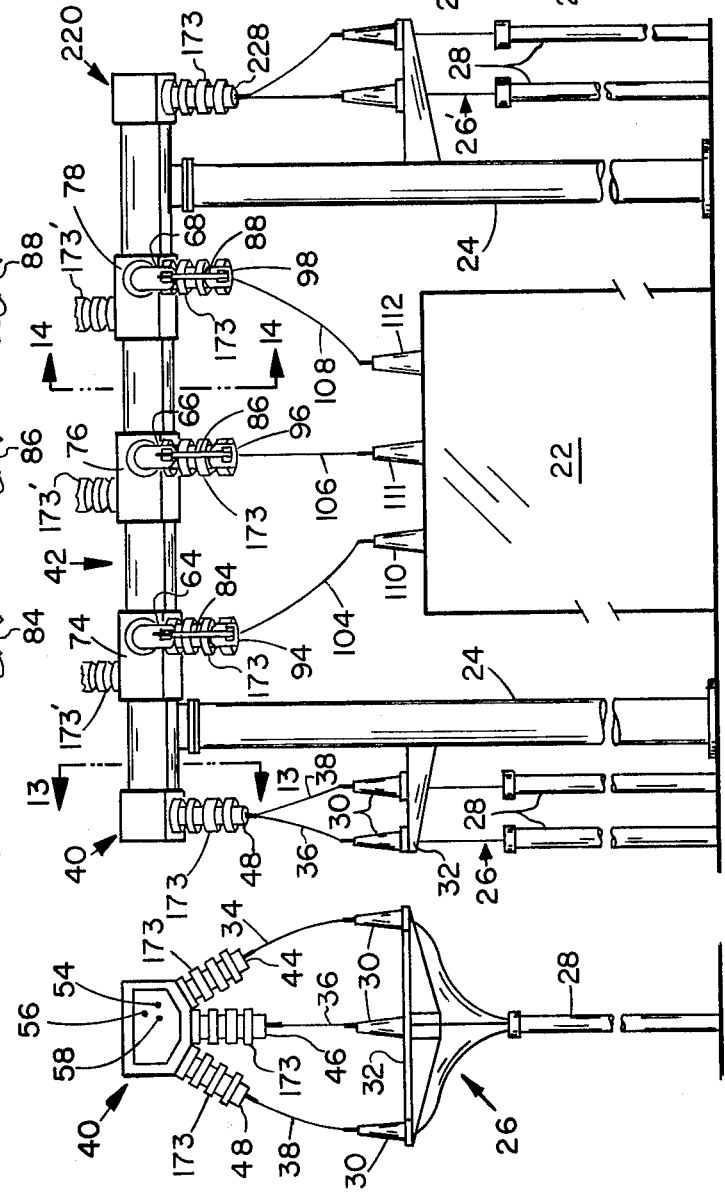

SWITCH BLOCK

This invention deals with high voltage switch gear and more specifically with unitary or integral switch blocks for use in electric power distribution facilities.

As used herein, the term "high voltage" refers to distribution substation voltage levels of, for example, 14,400 volts or 25,000 volts.

A conventional power distribution substation requires, for its construction, substantial amounts of structural steel to provide the necessary support for its high voltage power supply buses. Additionally, a considerable effort is involved in stringing the necessary high voltage insulators, interconnecting conductor cables and individually mounted knife switches for disconnecting and interconnecting the various circuits of the high voltage distribution system. All of these elements are presently field-assembled to meet the individual requirements of a particular substation. There are certain "building block" assemblies which, though common to most substations, must be assembled from the individual elements each time a substation is built.

It is an object of the present invention to provide a prefabricated unitary switch block with internal interconnections, to serve as a building block for substation construction to avoid such expensive field-assembly of some of the individual elements.

Additionally, it is an object of the present invention to provide such a switch block wherein the various disconnect switches, by-pass switches, and bus transfer switches essential to the construction and operation of a distribution substation are included as integral elements of the prefabricated switch block.

It is a further object of the present invention to provide such a switch block which can be prefabricated for later installation without having to be custom-built for a particular distribution substation. Obviously, such a switch block has an advantage over custom-built switch gear in that the prefabricated switch block can be installed and placed in operation with considerably greater ease and less time and expense than conventional substation switch gear. Additionally, such a switch block offers great advantages of safety of installation, operation and maintenance over conventional construction.

An additional object of the present invention is to provide a high voltage electric power distribution switch block comprising a first set of external bus terminals, a second set of external bus-side circuit recloser terminals and a third set of external bus-side circuit recloser terminals. A first set of external bus-side disconnect switches is provided for selectively connecting the terminals of the second set to corresponding ones of the terminals of the third set. The switch block further supports a fourth set of external load-side circuit recloser terminals, a fifth set of external load-side circuit recloser terminals and a second set of external load-side disconnect switches for selectively connecting the terminals of the fourth set to corresponding ones of the terminals of the fifth set. A sixth set of external terminals is included in the switch block. First means, housed internally of the switch block, couple the terminals of the first set to corresponding ones of the terminals of the second set.

In two embodiments of the present invention, the switch block further comprises second means for coupling the terminals of the fifth set to corresponding ones of the terminals of the sixth set. The sixth set of terminals comprises a set of external load terminals. The second coupling means are contained internally of the switch block.

In one of the aforementioned embodiments, the switch block also includes a seventh set of external by-pass switch terminals and third means for coupling the terminals of the seventh set to corresponding ones of the terminals of the sixth set. The third coupling means are housed internally of the switch block. A third set of by-pass switches selectively connects the terminals of the second set to corresponding ones of the terminals of the seventh set.

In a third embodiment of the invention, the switch block further comprises a seventh set of external bus transfer switch terminals and a fourth set of bus transfer switches for selectively coupling the terminals of the sixth set to corresponding ones of the seventh set of terminals. This embodiment includes fourth means, housed internally of the switch block, for coupling the terminals of the seventh set to corresponding ones of the terminals of the fifth set.

Additional objects of the present invention will become obvious to those skilled in the art to which the invention pertains by reference to the following description and accompanying drawings of which:

FIG. 1 is a front elevational view of a distribution station switch bay constructed in accordance with the present invention;

FIG. 2 is a top plan view of the elements illustrated in FIG. 1;

FIG. 3 is a fragmentary sectional view taken along section lines 3—3 of FIG. 1;

FIG. 4 is a fragmentary sectional view taken along section lines 4—4 of FIG. 1;

FIG. 6 is a front elevational view of a second embodiment constructed in accordance with the present invention;

FIG. 7 is a top plan view of the elements of FIG. 6;

FIG. 8 is a fragmentary sectional view taken along section lines 8—8 of FIG. 6;

FIG. 9 is a fragmentary sectional view taken along section lines 9—9 of FIG. 6;

FIG. 11 is a front elevational view of a third embodiment of the present invention;

FIG. 12 is a top plan view of the embodiment of FIG. 11;

FIG. 13 is a fragmentary sectional view taken along section lines 13—13 of FIG. 11;

FIG. 14 is a fragmentary sectional view taken along section lines 14—14 of FIG. 11.

Figure 5:
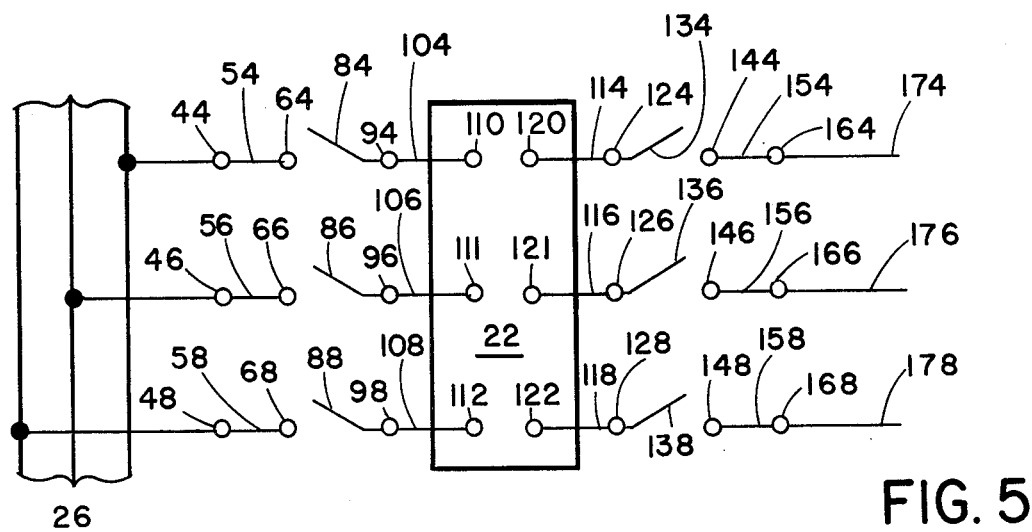
FIG. 5 is a schematic diagram of the elements illustrated in FIG. 1.

In the embodiment of the invention illustrated in FIGS. 1-5, a switch gear bay 20 for distributing power through an automatic circuit recloser 22 (which may be vacuum-type, oil-filled or other suitable type) comprises a pair of galvanized steel or aluminum pedestals 24 of square, round, tubular or other suitable cross section, size and strength. A multi-phase electrical power source circuit 26 illustratively comprises a three-phase, three-wire power supply bus rising through a suitable conduit 28 from an underground power supply circuit (not shown) and supported upon suitable cable terminators 30. Cable terminators 30 are located on a bracket 32 which forms a part of one of pedestals 24. The three-phase supply bus comprises three conductors 34, 36, 38 which are, of course, anchored to separate cable terminators 30.

From cable terminators 30, the three-phase conductors 34, 36, 38 rise to an entrance bushing 40 of a switch block 42. Switch block 42 is supported in place upon pedestals 24. Switch block 42 illustratively consists of a single block cast from butyl rubber or other suitable insulating material, properly reinforced for strength, durability and electrical insulating requirements. Entrance bushing 40 is cast onto the switch block and desirably consists of the same material. Three external bus terminals 44, 46, 48 project downwardly from the longitudinal axis of switch block 42 in a plane generally perpendicular to that axis. Terminals 44, 46, 48 are accessible from without switch block 42. These terminals are connected to the three-phase conductors 34, 36, 38, respectively.

As may best be seen in FIG. 3, terminals 44, 46, 48 are connected internally of switch block 42 to conductors 54, 56, 58, respectively. Conductors 54, 56, 58 are desirably molded into the switch block during its manufacture. Conductors 54, 56, 58 pass outwardly from switch block 42 to form external bus-side terminals 64, 66, 68, respectively. These bus-side disconnect switch terminals 64, 66, 68 are formed on suitably shaped support bushings 74, 76, 78, respectively, which are desirably integrally formed or molded from the same materials as the rest of switch block 42 during its manufacture.

Terminals 64, 66, 68 are shaped to receive bus-side disconnect knife switches 84, 86, 88, respectively. Switches 84, 86, 88 are supported by terminals 94, 96, 98, respectively, formed in support bushings 74, 76, 78, respectively. Conductors 104, 106, 108, respectively, connect terminals 94, 96, 98, respectively, to the bus-side bushings 110, 111, 112, respectively, of automatic circuit recloser 22.

Conductors 114, 116, 118 connect the load-side bushings 120, 121, 122, respectively, of circuit recloser 22 to three-phase load-side disconnect switch terminals 124, 126, 128. These terminals are housed in support bushings 74, 76, 78, respectively, which are integrally formed with switch block 42 when the switch block is fabricated. Terminals 124, 126, 128 support load-side disconnect knife switches 134, 136, 138, respectively.

Three-phase load-side disconnect switch terminals 144, 146, 148, also provided in support bushings 74, 76, 78 are formed to receive load-side disconnect knife switches 134, 136, 138, respectively. Terminals 144, 146, 148 are connected internally of the switch block 42 by load-side conductors 154, 156, 158, respectively, to load terminals 164, 166, 168, respectively. These load terminals are formed in an exit bushing 170 at the end of switch block 42 opposite entrance bushing 40. Bushing 170 is formed in the same manner as the entrance and support bushings during the manufacture of switch block 42.

As can be seen from FIGS. 1–5, external terminals formed on entrance and exit bushings 40, 170, respectively, are formed at the ends of insulating standards 173 which are disposed about the axis of switch block 42 and radiate outwardly therefrom at approximately 45° angles. The external terminals are thereby spatially isolated sufficiently from one another and from other equipment to prevent electrical breakdown and arcing due to the high potentials which these terminals will carry. Similarly, the external terminals supported by support bushings 74, 76, 78 radiate outwardly from the axis of switch block 42. The support bushing terminals are placed at the ends of insulating standards 173 which radiate from the axis of switch block 42 at approximately 60° angles in planes perpendicular to said axis.

From terminals 164, 166, 168, conductors 174, 176, 178 are connected to a plurality of cable terminators 180. Cable terminators 180 are mounted on a bracket 181 which is integrally connected to one of pedestals 24. Three-phase power is distributed from cable terminators 180 through three-phase conductors 182 which enter conduit 183 to distribute power to an electrical load (not shown) through underground load circuitry (not shown).

Power is supplied from the three-phase bus 26 through conductors 34, 36, 38 to external bus terminals 44, 46, 48. Power flows internally of switch block 42 through conductors 54, 56, 58 and the external bus-side disconnect switches 84, 86, 88, to bus-side bushings 110, 111, 112, respectively, of automatic circuit recloser 22. From the load-side bushings of circuit recloser 22, power flows through the load-side disconnect knife switches 134, 136, 138 and load-side disconnect switch terminals 144, 146, 148, respectively, to reenter switch block 42. Power is supplied through load-side conductors 154, 156, 158, internally of switch block 42 to external load terminals 164, 166, 168, respectively, on the exit bushing of switch block 42. From these terminals, the power is distributed to individual power customers through the load circuit. As may best be seen from FIG. 5, the supply bus may be isolated from the load circuit by opening either bus-side disconnect knife switches 84, 86, 88 or load-side disconnect knife switches 134, 136, 138. It may also be seen that automatic circuit recloser 22 can be isolated from both the supply bus and the load circuit by opening both sets of disconnect switches.

Figure 10:
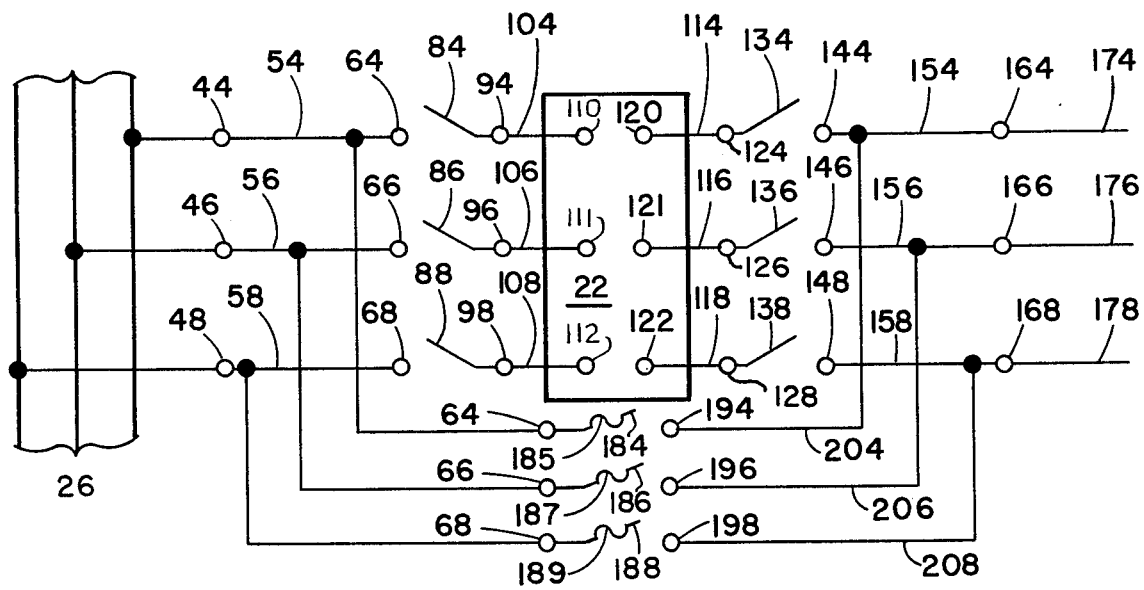
FIG. 10 is a schematic diagram of the embodiment of FIG. 6.

In the second embodiment of the invention, illustrated in FIGS. 6–10, those elements having identical numbers with the embodiment of FIGS. 1–5 perform the same or similar functions.

There have been added to the support bushing 74, 76, 78 of the second embodiment a plurality of by-pass switches 184, 186, 188. These by-pass switches, when closed, provide uninterrupted service to the power consumer connected to one or more of load conductors 174, 176, 178 while automatic circuit recloser 22 is being serviced.

To achieve this objective, terminals 64, 66, 68 of the preceding embodiment are altered so that each supports a by-pass knife switch 184, 186, 188, respectively. Further, support bushings 74, 76, 78 are altered to provide additional by-pass switch terminals 194, 196, 198 which are adapted to receive the ends of by-pass knife switches 184, 186, 188, respectively. These knife switches open in vertical arcs which are offset slightly from the planes of the arcs in which their adjacent disconnect switches 84, 86, 88, 134, 136, 138 open and close. This offset prevents operation of by-pass switches 184, 186, 188 from interfering with the operation of the disconnect switches. The offset is best illustrated in FIGS. 6 and 7.

By-pass switch terminals 194, 196, 198 are connected by conductors 204, 206, 208 internally of switch block 42 to external load terminals 164, 166, 168, respectively. Thus, when either the load-side or bus-side disconnect switches are thrown open and by-pass switches 184, 186, 188 are closed, power may be supplied directly from bus 26 to load conductors 174, 176, 178 through the by-pass switches.

Desirably, by-pass switches 184, 186, 188 contain cartridge fuses 185, 187, 189, respectively, to prevent overloading of conductors 174, 176, 178 from damaging the electrical distribution system when automatic circuit recloser 22 is out of circuit and the by-pass switches are closed.

In the second embodiment, each of the support bushings 74, 76, 78 is manufactured with an additional offset insulating standard 173' for the additional terminals 194, 196, 198. The additional standards 173' are desirably formed in the same manner as were the standards described in the first embodiment. The additional standards are also spaced 60° from an adjacent standard 173 in a plane perpendicular to the axis of switch block 42.

Figure 15:
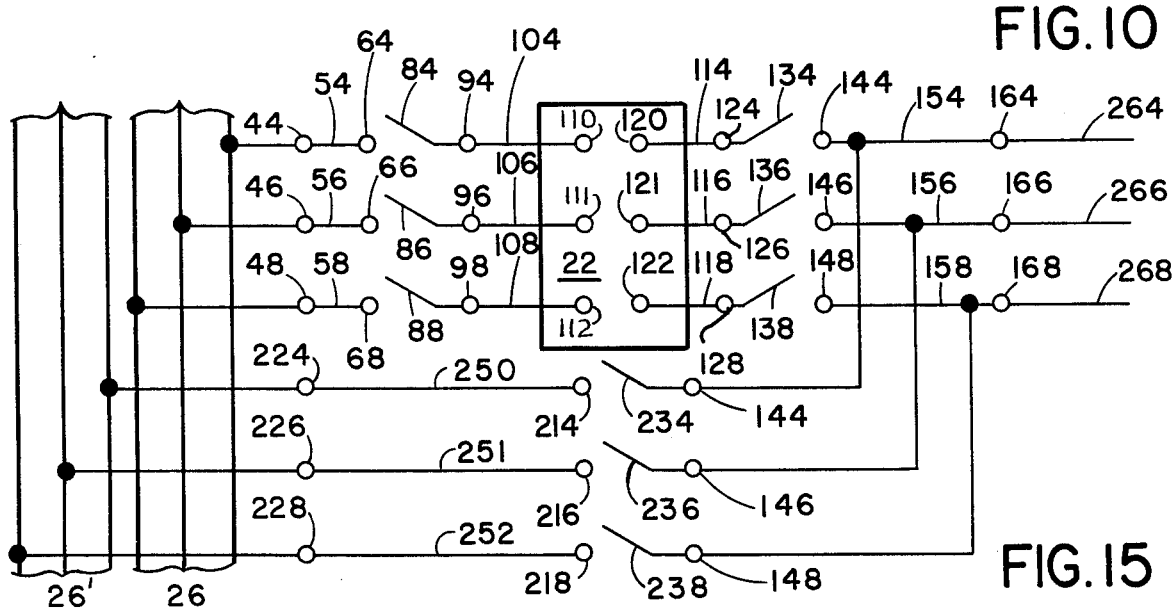
FIG. 15 is a schematic diagram of the embodiment of FIG. 11.

In a third embodiment of the invention, illustrated in FIGS. 11-15, an additional three-phase power source bus 26' is illustrated. Transfer bus 26' may be used to supply power to the load conductors 174, 176, 178 when there is an outage in main bus 26.

In this embodiment, as in the embodiment of FIGS. 6-10, an additional offset standard 173' is molded into each of support bushings 74, 76, 78 to provide a bus transfer switch terminal 214, 216, 218, respectively, for each phase of the transfer bus.

In this embodiment, exit bushing 170 is replaced by a transfer bus entrance bushing 220. Transfer bus entrance bushing 220 is manufactured in the same fashion as the entrance and exit bushings 40, 170, respectively, of the two prior embodiments. Transfer bus entrance bushing 220 supports external transfer bus terminals 224, 226, 228 from suitable insulating standards 173.

Support bushings 74, 76, 78 are constructed in the same fashion as the support bushings in the second embodiment (see FIGS. 6-10). By-pass knife switches 184, 186, 188 are replaced by a plurality of similarly constructed bus transfer knife switches 234, 236, 238. External terminals 214, 216, 218, respectively, are connected by conductors 250, 251, 252 internally of the switch block 42 to transfer bus terminals 224, 226, 228, respectively. The remaining terminals of bus transfer knife switches 234, 236, 238 coincide with load-side disconnect switch terminals 144, 146, 148, respectively, of the second embodiment. However, an additional connection, external to switch block 42 is made to each of terminals 144, 146, 148, as best illustrated in FIGS. 11, 12 and 14. These additional three-phase connections take the place of the exit bushing 170 in the first and second embodiments. That is, there is provided on each of switch terminals 144, 146, 148 of the third embodiment, in addition to one terminal of bus transfer knife switches 234, 236, 238, respectively, an external load terminal 164, 166, 168, respectively, for connecting load conductors 264, 266, 268, respectively, to the switch block. Load conductors 264, 266, 268 are connected from these terminals to suitable cable terminators 180 situated near the switch bay on a bracket 181, from which the load conductors run underground through conduit 28 to supply power to the load circuit (not shown).

It is to be noted that the switch blocks 42 of the second and third embodiments are externally identical in construction, the differences between the second and third embodiments being in the manner in which internal circuit connections are made between the external terminals of the switch blocks 42.

As may be seen, the third embodiment allows for the continuation of power service to customers connected to load conductors 264, 266, 268 during maintenance outages of main bus 26 by opening disconnect switches 84, 86, 88 or 134, 136, 138 and closing bus transfer knife switches 234, 236, 238 so that power is supplied to the load conductors from transfer bus 26'. Of course, as in the second embodiment, knife switches 234, 236, 238 can be equipped with integral cartridge fuses to prevent overloading from damaging the circuits.

It should further be noted that the vertical cross section of the switch block 42 of FIGS. 1-5 (see FIGS. 4-5) differs from the vertical cross section of switch blocks 42 of the second and third embodiments, FIGS. 6-15 (see FIGS. 8, 9, 13 and 14). The added cross sectional area in the second and third embodiment provides sufficient space in the switch blocks of these embodiments for the necessary additional internal conductors of these embodiments. It will be appreciated that several different cross sectional shapes and sizes may be used within the scope of the present invention.

There are thus illustrated unitary switch blocks having integral internal high voltage conductors. These prefabricated switch blocks can be used in place of the typically substantial amount of structural steel, hanging insulators and stringing of external high voltage wiring which go into the construction of a distribution substation. Use of these unitary switch blocks in place of the conventional construction offers added safety, ease of installation, flexibility in placement of the components of the distribution substation, better appearance, and significant cost savings in installation, operation and maintenance.

These unitary switch blocks are prefabricated and assembled to include all of the necessary switches for a particular application on their surfaces. For example, switches can be included on the switch block for disconnecting an automatic circuit recloser from the distribution circuit, by-passing the automatic circuit recloser to provide uninterrupted power during servicing of the recloser, or switching from a main power supply bus to a transfer bus to provide uninterrupted power during servicing of the main bus. All of the necessary conductors for a particular application are molded into these prefabricated switch blocks during manufacture.

What is claimed is:

1. For use with electric utilization means, a prefabricated multiple phase high voltage electric power distribution switch block comprising a first set of external terminals (44, 46, 48), a second set of external terminals (64, 66, 68), first means (54, 56, 58) for coupling terminals of said first set to corresponding terminals of said second set, a third set of external terminals (94, 96, 98), a first set of external switches (84, 86, 88) for selectively coupling said terminals of said second set to corresponding terminals of said third set, a fourth set of external terminals (124, 126, 128), the electric utilization means being coupled to the terminals of the third and fourth sets, a fifth set of external terminals (144, 146, 148), a second set of external switches (134, 136, 138) for selectively coupling the terminals of said fourth set to corresponding ones of the terminals of said fifth set, a sixth set of external terminals (164, 166, 168 or 224, 226, 228), and second means for coupling the terminals of the fifth set to corresponding ones of the terminals of the sixth set, said first coupling means being integrally molded into said switch block.

2. A switch block according to claim 1 wherein said second means (154, 156, 158) for coupling said terminals (144, 146, 148) of said fifth set to corresponding ones of the terminals (164, 166, 168) of said sixth set are integrally molded into said switch block.

3. A switch block according to claim 2 wherein said first set of external terminals comprises a set of electrical supply bus terminals (44, 46, 48), said first set of external switches (84, 86, 88) comprises a set of bus-side disconnect switches, said second set of external switches (134, 136, 138) comprises a set of load-side disconnect switches, said sixth set of external terminals (164, 166, 168) comprises a set of electrical load terminals, said second (64, 66, 68) and third (94, 96, 98) sets of external terminals comprise bus-side disconnect switch terminals and said fourth (124, 126, 128) and fifth (144, 146, 148) sets of external terminals comprise load-side disconnect switch terminals.

4. A switch block according to claim 2 and further comprising a seventh set of external terminals (194, 196, 198) and a third set of external switches (184, 186, 188) for selectively connecting said terminals of said second set to corresponding ones of the terminals of said seventh set, and third means (204, 206, 208) for coupling said terminals of said seventh set to corresponding ones of said terminals of said fifth set, said third coupling means being integrally molded into said switch block.

5. A switch block according to claim 4 wherein said third set of external switches comprises a set of by-pass switches and said second and seventh sets of external terminals comprise by-pass switch terminals.

6. A switch block according to claim 1 and further comprising a seventh set of external terminals (214, 216, 218) and a third set of external switches (234, 236, 238) for selectively connecting said terminals of said fifth set to corresponding ones of the terminals of said seventh set, and fourth means (250, 251, 252) for coupling said terminals of said sixth set to corresponding ones of said terminals of said seventh set, said fourth coupling means being integrally molded into said switch block.

7. A switch block according to claim 6 wherein said first set of external terminals comprises a set of main bus terminals, said first set of external switches comprises a set of main bus-side disconnect switches, said second and third sets of external terminals comprising main bus-side disconnect switch terminals, said second set of external switches comprises a set of load-side disconnect switches, said fourth and fifth sets of external terminals comprising load-side disconnect switch terminals, said fifth set of external terminals also comprising load terminals, said third set of external switches comprising a set of bus transfer switches and said fifth and seventh sets of external terminals comprising bus transfer switch terminals.

8. For use with an electric utilization means, a prefabricated high voltage electric power distribution switch block comprising a first set of external bus terminals (44, 46, 48), a second set of external bus-side circuit recloser terminals (64, 66, 68), a third set of external bus-side circuit recloser terminals (94, 96, 98), a first set of external bus-side disconnect switches (84, 86, 88) for selectively connecting the terminals of said second set to corresponding ones of the terminals of said third set, a fourth set of external load-side circuit recloser terminals (124, 126, 128), the electric utilization means being coupled to the third and fourth sets of terminals, a fifth set of external load-side circuit recloser terminals (144, 146, 148), a second set of external load-side disconnect switches (134, 136, 138) for selectively connecting the terminals of said fourth set to corresponding ones of the terminals of said fifth set, a sixth set of external terminals (164, 166, 168 or 224, 226, 228), first means (54, 56, 58) for coupling the terminals of said first set to corresponding ones of the terminals of said second set, and second means for coupling the terminals of the fifth set to corresponding ones of the terminals of the sixth set, said first coupling means being housed internally of said switch block.

9. A switch block according to claim 8 wherein said second means (154, 156, 158) for coupling the terminals of said fifth set to corresponding ones of the terminals of said sixth set are housed internally of said switch block.

10. A switch block according to claim 9 and further comprising a seventh set of external by-pass switch terminals (194, 196, 198), third means (204, 206, 208) for coupling the terminals of said seventh set to corresponding ones of the terminals of said sixth set, said third coupling means being housed internally of said switch block, and a third set of by-pass switches (184, 186, 188) for selectively connecting the terminals of said second set to corresponding ones of the terminals of said seventh set.

11. A switch block according to claim 10 wherein each said by-pass switch is fused (185, 187, 189) to prevent overloading.

12. A switch block according to claim 8 and further comprising a seventh set of external bus transfer switch terminals (214, 216, 218), a fourth set of bus transfer switches (234, 236, 238) for selectively coupling the terminals of said seventh set to corresponding ones of the terminals of said fifth set (144, 146, 148), and fourth means (250, 251, 252) for coupling the terminals of said sixth set (224, 226, 228) to corresponding ones of the terminals of said seventh set (214, 216, 218), said fourth coupling means being housed internally of said switch block.

13. The invention of claim 8 in which said switch block is formed from an axially elongated member having two opposite ends, each end supporting an end bushing (40, 170) with a plurality of end insulating standards (173) projecting outwardly from the elongated member axis, a plurality of bushings (74, 76, 78) spaced apart intermediate said ends, each said intermediate bushing supporting a plurality of intermediate insulating standards (173, 173') projecting outwardly from said axis, each said insulating standard having a proximal end connected to a respective one of said bushings and a distal end supported outwardly therefrom and providing an external surface of said switch block, one of said external terminals being mounted on each of said external surfaces, selected ones of said intermediate bushing standards further supporting respective ones of said disconnect switches externally of said switch block, said first coupling means comprising a plurality of conductors internally of said switch block for connecting the terminals of said first set of external terminals to corresponding ones of said second set of external terminals, said axially elongated member, bushings, end insulating standards and at least selected ones of said intermediate insulating standards being integrally and unitarily molded from an insulating material with said conductors molded therein, said conductors exiting through said distal ends of respective ones of said end insulating standards to form said first external terminals.

14. In combination, a multi-phase main power circuit bus (26), a multi-phase load circuit (174, 176, 178), a multi-phase automatic circuit recloser (22) for protecting said bus and load circuit against overloading, and a prefabricated unitary switch block (42), said switch block comprising a plurality of external bus terminals (44, 46, 48), a plurality of external load terminals (164, 166, 168), a plurality of external, selectively operable bus-side disconnect switches (84, 86, 88), each said switch having a terminal (64, 66, 68) connected internally (54, 56, 58) of said switch block to a corresponding one of said external bus terminals (44, 46, 48) and a terminal (94, 96, 98) connected to a corresponding terminal (110, 111, 112) of said circuit recloser (22), and a plurality of external, selectively operable load-side disconnect switches (134, 136, 138), each of the last said switches having a terminal (144, 146, 148) connected to a corresponding one of said external load terminals and a terminal (124, 126, 128) connected to a corresponding terminal (120, 121, 122) of said circuit recloser.

15. The combination of claim 14 wherein said switch block further comprises a plurality of external, selectively operable by-pass switches, each having one terminal connected externally of said switch block to a corresponding one of said bus-side disconnect switch terminals and thereby to a corresponding one of said external bus terminals, and another terminal connected internally of said switch block to a corresponding one of said load terminals for selectively by-passing said automatic circuit recloser.

16. The combination of claim 15 wherein each said by-pass switch is fused to prevent overloading.

17. The combination of claim 14 and further comprising a multi-phase transfer bus, wherein said switch block further comprises a plurality of external transfer bus terminals, each connected to a corresponding one of said transfer bus multiple phases, a plurality of external, selectively operable bus transfer switches, each having a terminal connected externally of said switch block to a corresponding one of said load-side disconnect switch terminals and a terminal connected internally of said switch block to a corresponding one of said transfer bus terminals.

18. For use with an electric utilization means, a prefabricated high voltage electric power distribution switch block (42) comprising an axially elongated member having two opposite ends, each end supporting an end bushing (40, 170) with a plurality of end insulating standards (173) projecting outwardly from the elongated member axis, a plurality of bushings (74, 76, 78) spaced apart intermediate said ends, each said intermediate bushing also supporting a plurality of intermediate insulating standards (173, 173') projecting outwardly from said elongated member axis, each of said intermediate standards having a proximal end connected to its respective one of said bushings and a distal end remote from its respective bushing, a plurality of first external bus terminals (44, 46, 48), a plurality of second external bus-side disconnect switch terminals (64, 66, 68), a plurality of third external bus-side disconnect switch terminals (94, 96, 98), a plurality of fourth external load-side disconnect switch terminals (124, 126, 128), the electric utilization means being coupled between the third and fourth terminals, a plurality of fifth external load-side disconnect swtich terminals (144, 146, 148), said distal ends of said end standards on one of said end bushings (40) each supporting one of said plurality of first terminals (44, 46, 48), said distal ends of said intermediate standards on each of said intermediate bushings supporting respective ones of said plurality of second terminals, said plurality of third terminals, said plurality of fourth terminals, and said plurality of fifth terminals, a plurality of first, selectively operable bus-side disconnect switches (84, 86, 88), a plurality of second, selectively operable load-side disconnect switches (134, 136, 138), each pair of said second and third terminals supporting between them, externally of their respective intermediate bushing, one of said plurality of first switches, and each pair of said fourth and fifth terminals supporting between them, externally of their respective intermediate bushing, one of said plurality of second switches, a plurality of first conductors (54, 56, 58), each having first and second ends, for connecting each of said plurality of first terminals to a corresponding one of said plurality of second terminals, said elongated member, bushings and end insulating standards all being integrally and unitarily molded from an electrically insulative material with said plurality of first conductors molded therein, said first ends of said first conductors exiting from said distal ends of respective ones of said end standards to form said plurality of first terminals.

19. The invention of claim 18 and further comprising a plurality of sixth external load terminals (164, 166, 168), a plurality of second conductors (154, 156, 158) each having first and second ends, respectively, for connecting each one of said plurality of fifth terminals to a corresponding one of said plurality of sixth terminals, respectively, said plurality of second conductors being molded into said insulative material, said distal end of each of said end insulating standards of the remaining one (170) of said end bushings supporting one of said plurality of sixth terminals, and said first ends of said second conductors exiting from said distal ends of respective ones of said end insulating standards to form respective ones of said sixth terminals.

20. The invention of claim 18 and further comprising a plurality of sixth external transfer bus terminals (224, 226, 228), a plurality of third conductors (250, 251, 252), each having first and second ends, a plurality of seventh external bus transfer switch terminals (214, 216, 218), and a plurality of selectively operable third bus transfer switches (234, 236, 238), each of said sixth terminals being mounted on one of the end insulating standards (173) of the remaining end bushing (220), each of said seventh terminals being mounted on an intermediate insulating standard (173') of each of said intermediate bushings (74, 76, 78); each of said third switches being supported on a respective one of said intermediate bushings for selectively coupling one of said seventh terminals to a respective one of said fifth terminals, each of said third conductors connecting one of said sixth terminals to a respective one of said seventh terminals, said plurality of third conductors being molded into said insulative material, said first ends of said third conductors exiting from said distal ends of respective ones of said end insulating standards to form respective ones of said sixth terminals.

* * * * *